Figure 2:
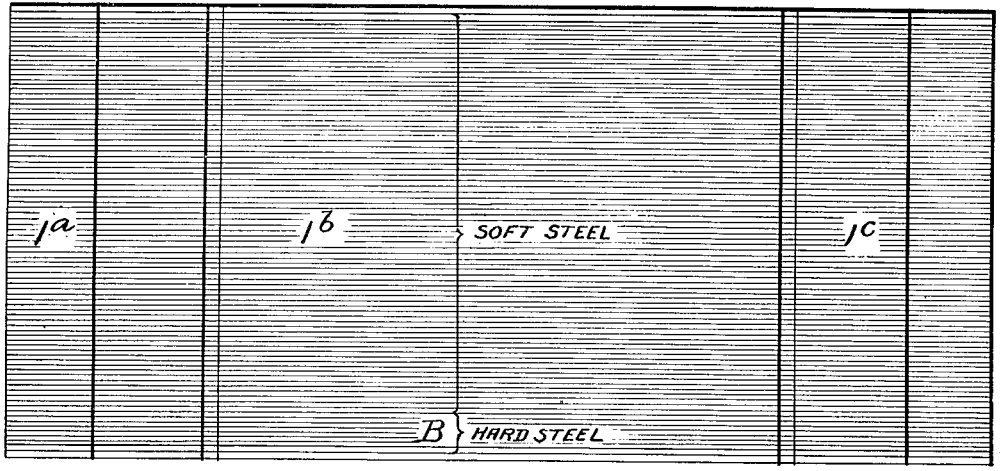

J. BURKE.
ALTERNATING CURRENT MOTOR AND GENERATOR.
APPLICATION FILED FEB. 8, 1917.

1,367,298.

Patented Feb. 1, 1921.

2 SHEETS—SHEET 1.

INVENTOR
James Burke
BY
Edwards, Sager & Richmond
his ATTORNEYS

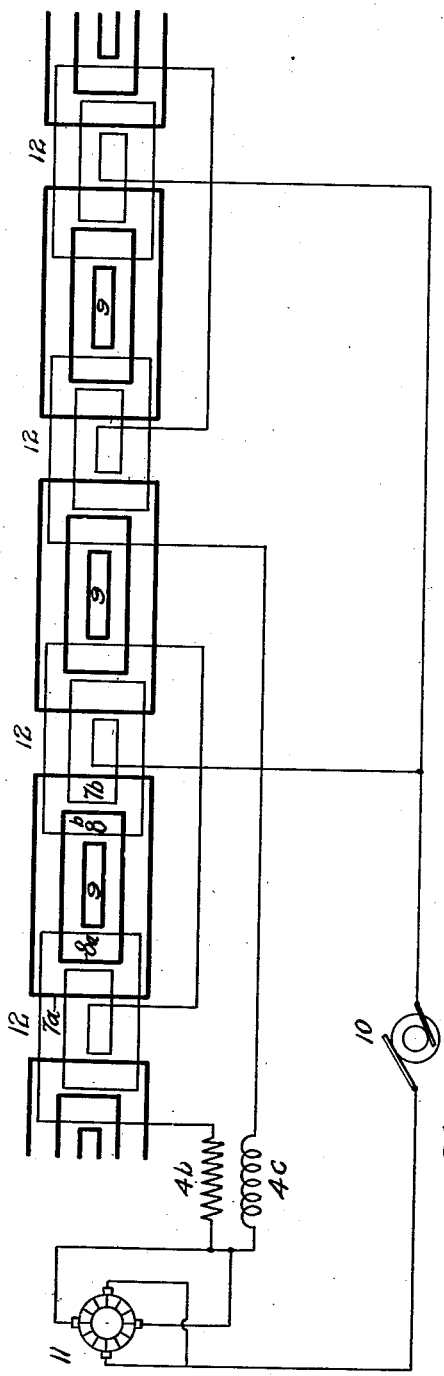
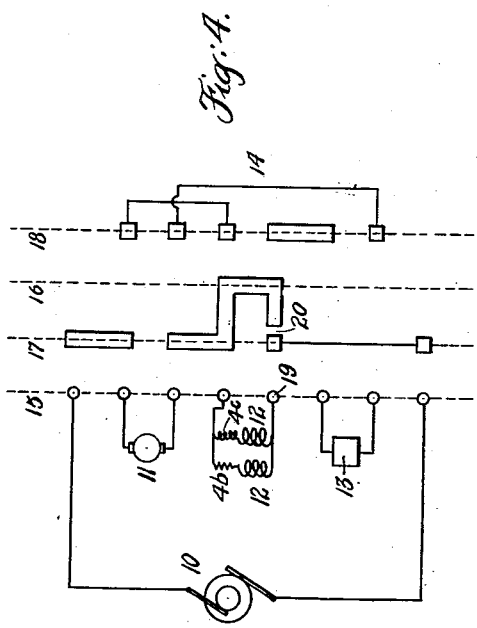

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

ALTERNATING-CURRENT MOTOR AND GENERATOR.

1,367,298.  Specification of Letters Patent.  Patented Feb. 1, 1921.

Application filed February 8, 1917. Serial No. 147,325.

*To all whom it may concern:*

Be it known that I, JAMES BURKE, a citizen of the United States, residing at Erie, in the county of Erie and State of Pennsylvania, have invented certain new and useful Improvements in Alternating-Current Motors and Generators, of which the following is a specification.

My invention relates to alternating current motors and particularly to such a motor which will also serve to regenerate current when driven by the load or by any means, or even when allowed to rotate at any time when the motor is disconnected from the supply lines.

In many instances it is desirable to utilize the regenerative function of electric motors, the motor itself serving to build up and excite its own field when operated as a generator, as in cases where an electrical braking action is required as in electrically operated elevators, motor vehicles, trains and the like, and when the regenerated energy is utilized for additional purposes as in many special instances, such as in railway switch and signal operation, as where it is important, after the motor has performed its work, to then generate a current in order to give by means of the current generated, an indication at a distant point that the motor has completed its function of moving a railway switch or other part to a desired position. There are various other applications for such a motor and considerable use has been made of motors operated by direct current with good practical results.

With motors operated by alternating current however, it is found that although the motor when used as a generator will build up and generate in some instances of operation, yet the same motor will at other times fail to build up its field or regenerate any appreciable current. This is due to the fact that when the alternating current supply to the motor is interrupted, the field magnets are in some instances left with insufficient residual magnetism to enable the motor, acting as a generator, to build up its field, but in other instances the reverse is the case, the result depending upon what particular instant of the cycle of the alternating current supplied to the motor the interruption of such supply current occurred.

By my invention the motor, although operated by alternating current as a motor, will always serve to operate as a generator and avoids any chance of the motor failing to so operate. I accomplish this by providing means which will insure the field magnets being left with sufficient residual magnetism to build up on, no matter what instant in the cycle the supply of alternating current to the motor may be interrupted.

Figure 1:
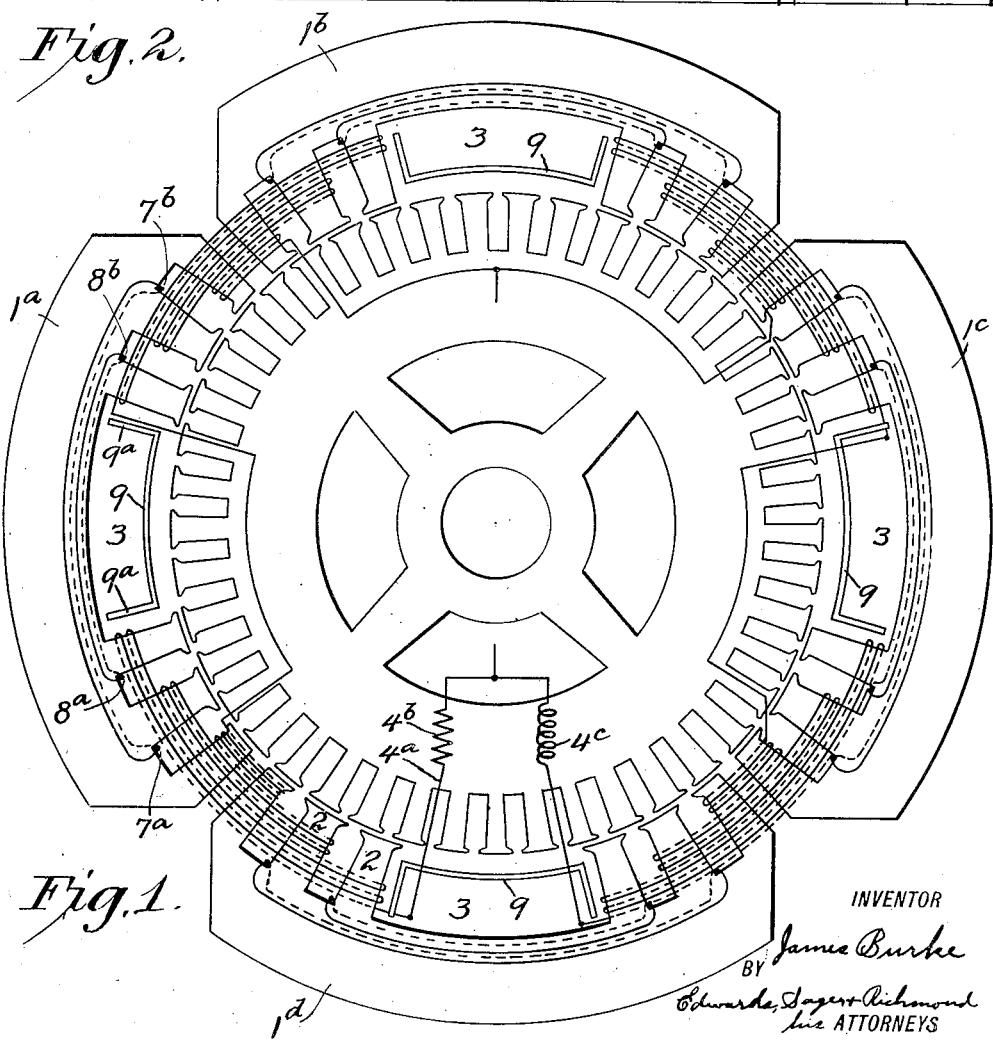

My invention will be understood from the following description and drawings illustrating a preferred embodiment thereof and in which Figure 1 is an end elevation of the laminæ of the stator and armature of the motor with the stator windings indicated diagrammatically; Fig. 2 is a side or edge view of the stator laminæ; Fig. 3 is a general diagram of the armature and field connections when operating as a motor; and Fig. 4 is a diagram of connections and development of a drum switch for controlling the operation as a motor or generator.

My present invention is illustrated as embodied in a motor of the form described and claimed in my application executed concurrently herewith, Serial Number 147,067, filed February 7, 1917, granted Mar. 11, 1919, Patent No. 1,296,620, although it may be applied to motors of other types and form of construction.

In this instance an alternating current motor of the series commutator type is utilized. Fig. 1 shows the form of the stator magnetic element and armature core. A four-pole field element is illustrated, although any desired number of poles may be utilized. The field element is shown divided into the same number of sections as there are poles, the separate sections being designated as $1^a$, $1^b$, $1^c$, and $1^d$, each section being made up of laminæ to the desired depth of the form shown having teeth 2 and a large central opening 3. Instead, however, of building the stator laminæ up entirely of iron or steel laminæ of uniform character, some of the laminæ are of different remanence from the others; thus in Fig. 2 the laminæ embraced in the bracket B are hardened steel and the remaining laminæ of the stator of soft steel. The proportion of the hardened laminæ may be varied and I have found that good results are obtained with the hardened laminæ about one-tenth or one-fifth of the total stator laminæ. Although in Fig. 2 the hardened laminæ are shown grouped together, they may be distributed among the laminæ of soft steel. Instead of using laminæ different only in degree of hardness, laminæ having different remanence by reason of other qualities than degree of hardness, may be used.

Each field section $1^a$ to $1^d$ is spaced from adjoining sections and as shown in Fig. 1 is spaced about the width of a slot between the teeth, and each section is cut away at the outer corners which reduces the magnetic conductivity between adjoining sections. The four magnetic sections are of course suitably supported in a housing frame, preferably of non-magnetic material, so as to retain the relative positions shown.

The teeth at the end of each magnetic section coöperate with the teeth at the end of an adjoining section to form a field pole; thus the field winding, which is distributed, is indicated as made up of three coils per pole, the number of turns per coil being of a suitable number and of course much larger for this type of motor than the two turns indicated, this number being shown for convenience. Taking the lower left-hand pole, the field winding is shown as starting at $4^a$, the first field coil embracing three teeth of the magnetic section $1^d$, and three teeth of the section $1^a$. This coil is connected in series with the next coil which embraces two teeth of section $1^d$ and two teeth of section $1^a$; this coil is in turn connected in series with the inner coil, which embraces one tooth of each adjoining section. The next field coil similarly embraces the teeth of section $1^a$ and $1^b$, the direction of the current through the coils of this pole being reverse to that of the one just described and as indicated in the connections of Fig. 1. The remaining poles are similarly wound, successive poles being wound to give alternate polarity. Although the three coils of each pole are described as being concentric with each other, they may in some cases be of the same size and distributed and overlapping so as to each embrace the same number of teeth.

The field coils are connected in multiple, the two left-hand field coils of Fig. 1 being connected in series with each other, but in multiple with the two right-hand field coils of Fig. 1, which latter are connected in series with each other. In series with the windings of the two left-hand field poles is a non-inductive resistance $4^b$, which in some instances may be included in the internal resistance of said windings, and in series with the windings of the two righthand field poles is indicated an inductive resistance $4^c$. This results in the phase of the current passing through the winding of the left-hand two field poles being in advance of the current passing through the windings of the right-hand two field poles for the purpose described hereinafter. In some cases sufficient phase difference of the currents through the field coils may be obtained by use of a resistance $4^b$ alone or by inductive resistance $4^c$ alone and various other means may be used for obtaining the phase difference, such as by using a different number of turns in the field windings of the two parallel circuits, or placing such windings at different depths in the slots, or by positioning the rotor nearer to one pair of poles than to the other poles, and so forth. I have found that a difference in phase of about 10° has produced good results, but the amount of this phase difference may be adjusted to suit the particular requirements.

The armature is made up of laminæ of the form shown in Fig. 1 with the armature teeth preferably in unsymmetrical relation to the teeth of the field poles, the armature having forty-five slots in this instance.

The stator element is indicated as being provided with compensating windings, each magnetic field section $1^a$, $1^b$, $1^c$ and $1^d$ being similarly wound with short-circuited windings. In one slot nearest one end of section $1^a$ is diagrammatically indicated a conductor $7^a$, and in the corresponding slot at the other end of section $1^a$ is indicated a conductor $7^b$. These two conductors are closed on themselves by end connections as diagrammatically indicated, the coil having a very low resistance and may be in bar or plate form to secure the low resistance. Located in the nearest adjoining slots of magnetic section $1^a$ are conductors $8^a$ and $8^b$ which are similarly closed on themselves by end connections, this coil similarly being of low resistance. In the central open space 3 of the magnetic section $1^a$ is located a plate 9 of low resistance and is shown as having outwardly extending ends $9^a$, which may serve to conveniently hold the low resistance plate 9 in the position shown. There is thus provided a number of individually short circuited coils or conductors which are concentrically arranged with reference to each other.

Fig. 3 is a general diagram illustrating the circuit connections, when operating as a motor, the single phase source of energy being indicated at 10. The armature with its four brushes is indicated in general at 11 and is shown connected in series with the two groups of field windings 12 connected in parallel with each other as already described. The low resistance plates 9 and low resistance conductors of coils $7^a$, $7^b$, and $8^a$, $8^b$ are also indicated in a general way in Fig. 3. The four commutator brushes are placed so as to commute the current in the coils when the latter are approximately in the neutral position in relation to the stator field.

Referring to Fig. 4, the parts already described are indicated by corresponding reference characters, the additional element of Fig. 4 shown at 13 representing any desired translating device or low resistance. In some cases it might be an indicating relay or device of a railway switch or signal mechanism, a resistance for absorbing the braking energy, a storage battery charged by the regenerated energy, a magnet for controlling the operation of some other mechanism, an electric light or any other desired translating device. The contacts on the drum of a drum controller are indicated at 14 and the fixed contacts of the controller to which the devices already described are connected as shown, are indicated on the dotted line 15. The dotted line 16 indicates the off-position of the controller, the line 17 the running position when the motor is operated from a source of alternating current and the line 18 the contacts for securing operation of the motor as a generator.

Assuming the controller to be in the running position with the fixed contacts in engagement with the contacts on the line 17, it will readily be seen that current passes from the alternating current source 10 through the motor armature 11 and field windings 12 and the non-inductive and inductive resistance as 4$^b$ and 4$^c$ in parallel circuits as already described, and then back to the alternating current source giving operation of the motor as a series alternating current motor driving any mechanical load desired. When the controller is moved from this running position to the off-position 16, the motor is disconnected from the source and in the off-position the windings of the field poles of the stator will be connected in a circuit closed on themselves. Furthermore, in passing from the motor running position to the off-position, the field coil circuits are not interrupted, the contact 19 bridging the contacts at 20 so there is no sudden interruption of the field circuit when the supply current is cut off, the field coils as above stated being closed on themselves in passing to and at the off-positon.

When the controller is moved to the position for securing operation of the motor as a generator, it will be evident by following the circuits secured by connection on the line 18 of the controller that the motor armature is connected in series with the field coils and with the device 13 in a closed circuit, the connections of the armature and field circuits being however reversed from the condition when running as a motor in order to secure the proper building up of the stator field for operation as a generator.

Although a form of drum controller has been indicated in Fig. 4, any other suitable form of switch might be used and operated manually or automatically by the mechanism controlled thereby, or in any other way desired.

The operation of my improved motor in a general way when operating as an alternating current motor is that of an inductively neutralized series motor in the particular embodiment disclosed. With reference to the particular features of my present invention, they all coöperate in preserving an appreciable amount of residual magnetism in the magnetic portions of the field or stator element, so as to positively insure the building up of the magnetic field when acting as a generator. Thus the provision of laminæ of different magnetic characteristics in the stator or field element, such as soft and hardened laminæ, results in the cycle of the magnetization of the hardened laminæ being delayed or at a certain lag behind the cycle of the magnetization of the laminæ which are not hardened. On account of the fact that the laminæ of higher retentivity are distributed circumferentially throughout all sections of the magnetic portion of the stator, and because of this distribution the laminæ of higher retentivity and laminæ which are of lesser retentivity being subjected to the same alternating exciting current through the field windings, it follows that regardless of the particular instant of interruption of the alternating current supplying the field windings, certain of the laminæ will always, in practice, retain an appreciable amount of residual magnetism. Again, with the field windings connected in parallel as above described and the exciting current in windings of certain poles lagging behind the current in certain of the windings of the other poles, there results a condition, regardless of the instant of the cycle when the alternating supply current is interrupted, that there always will be an appreciable current passing through at least some of the field windings at the time of interrupting the cycle, resulting in certain of the magnetic poles being left with a certain amount of residual magnetism. By virtue of the fact that the flux paths of the magnetism created by the currents in the field coil of one phase being different from the magnetic paths created by the current in the field coils of different phase, the possibility of the magnetizing effects of the dephased currents neutralizing each other is avoided. The feature of my present invention by which the field pole windings are kept closed in a local circuit when the alternating supply current is interrupted, also serves to prevent the sudden interruption of current through the exciting field windings and by giving a closed path for the field windings after the supply current has been cut off, a gradual reduction of the current in the field windings is obtained which tends to preserve the retention of residual magnetism in the magnetic element of the field to a much higher degree than is the case when the magnetic element of the field is submitted to a shock or an abrupt deënergization of the field coils. Of course, this placing of the field windings in a closed local circuit upon the interruption of the alternating supply current is merely a transitory condition in passing from the operation of the machine as an alternating current motor to the operation as a direct current generator.

It follows from the above that when the circuits are changed to cause the operation of the machine as a generator, there will always be sufficient residual magnetism in the magnetic element or stator to permit the machine when starting to operate as a generator to readily pick up and self excite its field and windings by the direct current of regeneration and the machine will then act as a generator for supplying direct current which might be used for any purpose desired as already explained, as long as the momentum of the motor or driven load continues to mechanically drive the armature for regenerative purposes.

Although my invention has been described in one specific embodiment, it will be understood that various modifications may be made therein without departing from the scope of my invention.

I claim:—

1. An alternating current motor having a laminated field element, said laminated field element being built up of laminæ having radially extending portions forming poles integral with circumferentially extending portions of said laminæ, and field windings embracing said radially extending portions, certain layers of said laminæ having different remanence from that of other layers of said laminæ.

2. An alternating current motor having a laminated field element, said laminated field element being built up of laminæ having radially extending portions forming poles integral with circumferentially extending portions of said laminæ, and field windings embracing said radially extending portions, certain layers of said laminæ being of hardened steel and other layers of said laminæ being of soft steel.

3. An alternating current motor having field windings, an armature and current rectifying means adapted to excite the field element when acting as a generator, and means for causing a lag between the currents exciting said field windings when excited by alternating current, the flux created by said dephased field currents having independent paths in portions of said field element.

4. An alternating current motor, controlling means for causing the same to operate as a motor and as a generator and for placing the field windings of the motor in a closed local circuit when discontinuing the operation of the motor from the alternating current source, and means for insuring the retention of residual magnetism in the field element when the alternating current supply is interrupted.

5. In an alternating current motor having field windings and a laminated field element, said element having a portion of its magnetic material of different remanence from that of another portion, an armature and current rectifying means adapted to excite the field element when operating as a generator, and means for causing a lag between the currents exciting said field windings when excited by alternating current, the flux created by said dephased field currents having independent paths in portions of said field element.

6. An alternating current motor having field windings and a laminated field element, said element having a portion of its magnetic material of different remanence from that of another portion, controlling means for connecting the motor to an alternating current source to operate as a motor and for disconnecting from said source and to connect to a translating device to operate as a generator and for placing the field windings of the motor in a closed local circuit when discontinuing the operation of the motor from the alternating current source.

7. An alternating current motor having field windings, an armature and current rectifying means adapted to excite the field element when operating as a generator, means for causing a lag between the currents exciting said field windings when excited by alternating current, the flux created by said dephased field currents having independent paths in portions of said field element, controlling means for connecting the motor to an alternating current source to operate as a motor and for disconnecting from said source to connect to a translating device to operate as a generator and for placing the field windings of the motor in a closed local circuit when discontinuing the operation of the motor from the alternating current source.

8. An alternating current motor having a laminated field element; said element having a portion of its laminæ of different remanence from that of another portion, field windings, an armature and current rectifying means adapted to excite the field element when operating as a generator, means for causing a lag between the currents exciting said field windings when excited by alternating current, the flux created by said dephased field currents having independent paths in portions of said field element, controlling means for connecting the motor to an alternating current source to operate as a motor and for disconnecting from said source to connect to a translating device to operate as a generator and for placing the field windings of the motor in a closed local circuit when discontinuing the operation of the motor from the alternating current source.

9. An alternating current motor having a stator winding, a rotor winding, short circuited compensating conductors, and means for insuring the self excitation of said motor when operated as a generator.

10. An alternating current motor having a field element, an armature having a commutator adapted to excite the field element when operating as a generator, short-circuited compensating conductors on the field element, and means for insuring the retention of residual magnetism in the field element when the alternating current supply is interrupted.

11. An alternating current motor having a laminated field element, distributed field windings thereon, short circuited compensating windings thereon, an armature having a commuator adapted to excite the field element when operating as a generator and means for insuring the retention of residual magnetism in the field element when the alternating current supply is disconnected.

JAMES BURKE.